July 30, 1935.  J. J. HERLIHY ET AL  2,009,774
CAP TURNING IMPLEMENT
Filed July 20, 1934
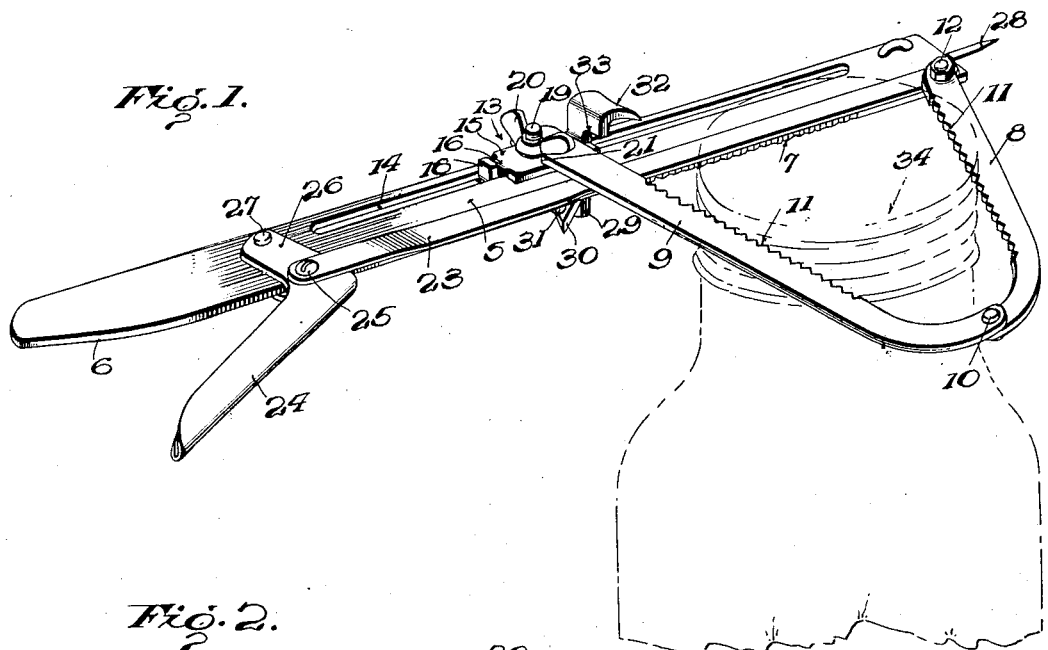
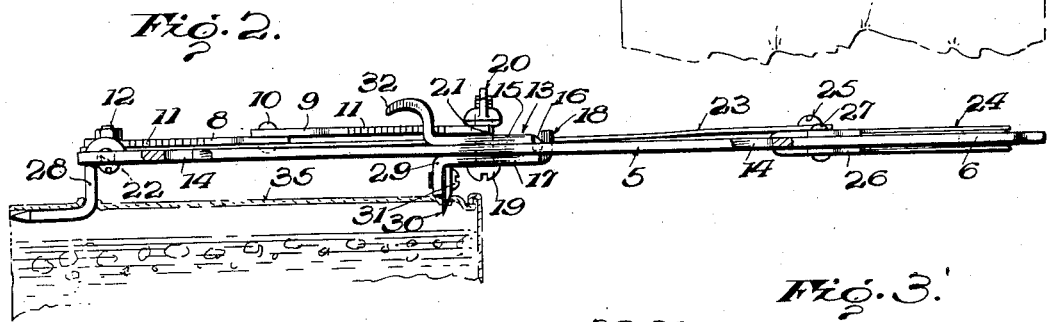
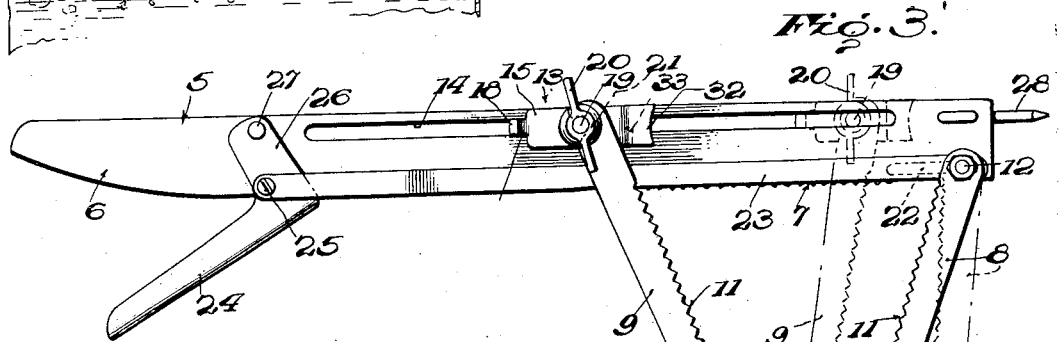
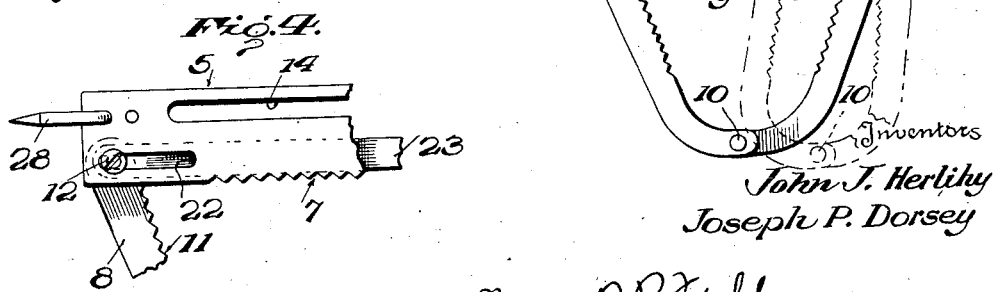
Inventors
John J. Herlihy
Joseph P. Dorsey Patented July 30, 1935

2,009,774

UNITED STATES PATENT OFFICE 2,009,774

CAP TURNING IMPLEMENT

John J. Herlihy and Joseph P. Dorsey, Weston, W. Va.

Application July 20, 1934, Serial No. 736,240

9 Claims. (Cl. 81—3.1)

The present invention relates to improvements in an implement for applying and removing the caps of jars, bottles or the like.

An important object of the invention is to provide an implement of the above mentioned character, having a large range of adjustment so that it will properly engage caps of different sizes.

A further object of the invention is to provide an implement of the above mentioned character which may be used as a nut cracker.

A further object of the invention is to provide an implement of the above mentioned character which may be used as a can opener.

A further object of the invention is to provide an implement of the above mentioned character so constructed that the pull upon the implement to shift the same in turning the cap will also be utilized in clamping the jaws upon the cap.

Other objects and advantages of the invention will be apparent during the course of the following description.

In the accompanying drawing forming a part of this application and in which like numerals are employed to designate like parts throughout the same, Figure 1 is a perspective view of an implement embodying my invention, showing the same applied to a threaded cap, to turn it, Figure 2 is a side elevation of the implement, showing the same used as a can opener, Figure 3 is a plan view of the implement, illustrating its range of adjustment, and, Figure 4 is a fragmentary bottom plan view of the implement.

In the drawing, wherein for the purpose of illustration is shown a preferred embodiment of our invention, the numeral 5 designates a lever, preferably in the form of a flat strip of metal. The rear end of this lever has its forward edge 6, preferably tapered, as shown. Near its forward end, the lever 5 has its forward edge provided with serrations 7, of any well known or preferred type.

Coacting with the forward end of the lever 5 is a forward swinging jaw 8 and a rear swinging and adjustable jaw 9, these two jaws being pivotally connected at their free ends, as shown at 10. The jaws 8 and 9 project laterally beyond the serrations 7, as shown, and these jaws are provided upon their inner edges with serrations 11, of any well known or preferred type. While serrations are preferred, the invention is not restricted to their use, as the device will operate with some degree of success without serrations.

The forward jaw 8 is pivotally connected with the forward end of the lever 5, as shown, by a bolt 12.

The numeral 13 designates a carriage or slide, as a whole, which is longitudinally adjustably mounted upon the lever 5, in proximity to a longitudinal slot 14, formed in the lever. This slide embodies an upper plate 15, having a depending tongue 16, entering the slot 14, and a lower plate 17, having an upwardly projecting tongue 18, passing upwardly through the slot 14, as more clearly shown in Figure 2. The plates 15 and 17 have openings formed therein to receive a bolt 19, extending above the upper plate 15 and having a winged nut 20. The inner end of the jaw 9 has an opening 21 to receive the bolt 19 whereby this jaw is pivotally connected with the slide.

The bolt 12 operates within an elongated slot 22 formed in the forward end portion of the lever 5 near its forward edge, while the slot 14 is arranged near the rear edge of the lever 16. The bolt 12 passes through an aperture in the forward end of a link 23, and thereby pivotally connects the link with the jaw 8, and this link extends rearwardly and is pivotally connected with a hand-grip 24, as shown at 25. This hand grip has a transverse extension 26, which is pivotally connected with the lever 5, as shown at 27.

At its forward end, the lever 5 is provided with a pointed prong 28, rigidly secured thereto and extending below the lever. This prong is adapted to be forced into the top of a tin can. The plate 17 carries a depending extension 29, having a blade 30 attached thereto by means of a screw 31 or the like, and this blade is adapted to be forced into the top of the can.

The plate 15 is provided with an upwardly projecting jaw 32, for engagement with crown stoppers or caps of bottles, to remove them. The shank of the jaw 32 has a notch 33 cut therein, to receive the inner portion of the jaw 9, when the jaw is expanded to the maximum open position.

In the use of the implement for applying or removing screw-threaded caps 34 of a jar, bottle or the like, the hand-grip 24 is shifted to the forward or open position, and the winged nut 21 is loosened and the slide 13 longitudinally adjusted upon the lever 5, so that the jaws 8 and 9 have a sufficient space therebetween to receive the cap 34 and will approximately fit thereon. The winged nut 21 is now screwed up and the slide is clamped in the adjusted position upon the lever 5. The jaws 8 and 9 are applied to the opposite sides of the cap 34, while the serrations 7 of the lever 5 also engage with the cap. In Figure 1, the implement is applied to the cap so that it may be employed to tighten or screw up the cap. The lever 5 is arranged to be swung toward the operator. The operator grasps the rear end of the lever 5 and the hand-grip 24 and a rearward pull on these parts will first shift the hand-grip 24 rearwardly, with respect to the lever, turning the hand-grip upon its pivot 27, drawing the link 23 rearwardly, and shifting the inner end of the jaw 8 toward the oppositely arranged jaw 9, whereby these jaws will have proper clamping engagement with the cap 34. Further rearward pull upon the lever 26 will turn the cap 34 and at the same time hold the jaws 8 and 9 in clamping engagement with the cap. To unscrew the cap, the implement will be inverted, and the jaws 8 and 9 will then extend in the same direction, but the handle 5 will then extend to the left instead of the right. The handle is again drawn toward the operator.

When the implement is used as a can opener, the prong 28 is forced into the center of the top 35 of a tin can, while the blade 30 is forced through the top 35, and the lever 5 is rotated about the prong 28 as a pivot, whereby the blade 30 will properly cut the top 35.

The implement may be inverted and the jaw 32 engaged beneath a crown stopper or cap to remove the same.

The slide 13 may be shifted to the forwardmost position upon the lever 5, and clamped in this position, at which time the jaws 8 and 9 will be arranged in such close relation that the implement may be used as a nut cracker. By swinging the hand-grip 24 rearwardly, jaw 8 will be shifted toward the jaw 9, and a nut arranged between these jaws will be cracked.

It is to be understood that the form of our invention herewith shown and described is to be taken as a preferred example of the same and that various changes in the shape, size and arrangement of parts may be resorted to without departing from the spirit of my invention or the scope of the sub-joined claims.

Having thus described my invention, what we claim is:

1. An implement for turning a cap upon a jar, bottle or the like, comprising a lever, a slide longitudinally adjustably mounted upon the lever, means to clamp the slide in the selected adjusted position upon the lever, a jaw extending transversely of the lever and having its inner end connected with the slide, a second jaw disposed opposite the first named jaw and having its outer end pivotally connected with the outer end of the second named jaw, and means slidably connecting the inner end of the second named jaw with the lever and adapted to shift such inner end longitudinally of the lever.

2. An implement for turning a cap upon a jar or bottle, comprising a lever, a slide longitudinally adjustably mounted upon the lever, a jaw extending transverse of the lever and having its inner end connected with the slide, a second jaw arranged opposite the first named jaw and having its outer end connected with the corresponding end of the first named jaw in such a manner that said jaws are adapted to have relative movement, and means mounted upon the lever to shift the inner end of the second named jaw longitudinally of the lever.

3. An implement for turning a cap upon a jar or bottle, comprising a lever, a slide mounted upon the lever to be adjusted longitudinally thereof, a jaw extending transversely of the lever, means to connect the inner end of the jaw with the slide and to clamp the slide in a selected adjusted position upon the lever, a second jaw arranged opposite the first named jaw and having its outer end pivotally connected with the corresponding end of the first named jaw, a link extending longitudinally of the lever, an element shiftable longitudinally upon the lever and pivotally connecting the inner end of the second named jaw and link, and a hand-grip arranged near the rear end of the lever and pivotally connected with the link and lever.

4. An implement for turning a cap upon a jar or bottle, comprising a lever provided near its forward end with an elongated slot and also having a longitudinal slot, a forward jaw arranged transversely of the lever and disposed near the elongated slot, a link extending longitudinally of the lever, a pivot element extending through the elongated slot and connecting the link and the inner end of the jaw, a rear jaw extending transversely of the lever and having its outer end pivotally connected with the outer end of the forward jaw, a bolt passing through the longitudinal slot and engaging the rear jaw, a nut carried by the bolt to clamp the bolt in a selected position within the longitudinal slot and a hand-grip pivoted to the lever near its rear end and pivotally connected with the link.

5. An implement for turning a cap upon a jar or bottle, comprising a lever having a longitudinal slot extending to a point near the forward end of the lever, said lever having an elongated slot near its forward end, a forward jaw, a link extending longitudinally of the lever, a pivot element passing through the elongated slot and connecting the jaw and link, a slide mounted upon the lever to move longitudinally thereof, a rear jaw having its outer end pivotally connected with the outer end of the forward jaw, an adjustable clamping bolt passing through the longitudinal slot for engaging the slide and rear jaw and adapted to clamp the slide to the lever, the arrangement being such that the rear jaw has a long range of adjustment and may be shifted forwardly to a position near the forward jaw so that the implement can be employed as a nut cracker, and a hand grip pivoted to the lever and pivotally connected to the link.

6. An implement for turning a cap upon a jar or bottle, comprising a lever, a jaw extending transversely of the lever, means to connect the jaw with the lever and shift the same longitudinally of the lever, a second jaw disposed opposite the first named jaw and connected therewith in such a manner that the second jaw is movable with relation to the first named jaw, and means adjustable longitudinally of the lever and connected with the second jaw.

7. An implement for turning a cap upon a jar or bottle, comprising a lever, a jaw arranged near the lever, a second jaw arranged near the lever and opposite the first named jaw and having one end thereof connected with the corresponding end of the first named jaw in such a manner that said jaws may have relative movement, means to connect the first named jaw with the lever and to shift a portion of the first named jaw toward the second named jaw, and a device adjustably mounted upon the lever and connected with the second named jaw and adapted to hold a portion of the second named jaw in adjustment at different selected distances from the connection between the first named jaw and lever.

8. An implement for turning a cap upon a jar or bottle, comprising a lever, a jaw arranged near the lever, a second jaw arranged near the lever and opposite the first named jaw and having one end portion thereof connected with the corresponding end portion of the first named jaw in such a manner that said jaws may have relative movement, means to connect the first named jaw with the lever so that a portion of the first named jaw may be shifted toward the second named jaw, manually operated means to shift the portion of the first named jaw toward the second named jaw, and a device adjustably mounted upon the lever and connected with the second named jaw and adapted to hold a portion of the second named jaw in adjustment at different selected distances from the connection between the first named jaw and lever.

9. An implement for turning a cap upon a jar or bottle, comprising a lever, a pair of oppositely arranged jaws disposed near the lever and extending outwardly beyond the same side of the lever for a substantial distance, means pivotally connecting the outer ends of the jaws, said jaws converging outwardly when in the opened position and forming with a portion of the lever a generally triangular structure, means adjustable longitudinally of the lever and secured to the inner portion of one jaw, and manually operated means carried by the lever and connected with the inner portion of the other jaw to adjust the same.

JOHN J. HERLIHY.
JOSEPH P. DORSEY.